(12) United States Patent
Ingram et al.

(10) Patent No.: US 7,346,999 B2
(45) Date of Patent: Mar. 25, 2008

(54) METHODS AND SYSTEM FOR INSPECTION OF FABRICATED COMPONENTS

(75) Inventors: Douglas Edward Ingram, Cincinnati, OH (US); Francis Howard Little, Cincinnati, OH (US); Melvin Howard Wilkins, Loveland, OH (US)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 11/037,798

(22) Filed: Jan. 18, 2005

(65) Prior Publication Data

US 2006/0156566 A1    Jul. 20, 2006

(51) Int. Cl.
*G01B 5/20* (2006.01)
(52) U.S. Cl. .......................... 33/554; 33/551; 702/167
(58) Field of Classification Search .......... 33/551–556; 702/167–168
See application file for complete search history.

(56) References Cited

U.S. PATENT DOCUMENTS

| | | | | |
|---|---|---|---|---|
| 3,279,079 A | * | 10/1966 | Schiler | 33/556 |
| 3,911,257 A | * | 10/1975 | Whitehouse et al. | 702/168 |
| 4,265,022 A | * | 5/1981 | Noguchi et al. | 33/553 |
| 4,324,049 A | * | 4/1982 | Blose | 33/199 B |
| 4,644,274 A | * | 2/1987 | Casarcia | 324/262 |
| 4,679,331 A | * | 7/1987 | Koontz | 33/551 |
| 4,908,782 A | * | 3/1990 | Pekarek et al. | 702/167 |
| 4,976,043 A | * | 12/1990 | Bieg | 33/551 |
| 4,989,338 A | | 2/1991 | Tsuji et al. | |
| 5,345,514 A | * | 9/1994 | Mahdavieh et al. | 382/152 |
| 5,371,462 A | * | 12/1994 | Hedengren et al. | 324/225 |
| 5,694,339 A | * | 12/1997 | Ishitoya et al. | 702/167 |
| 5,740,616 A | | 4/1998 | Seddon et al. | |
| 6,094,269 A | * | 7/2000 | Ben-Dove et al. | 356/623 |
| 6,401,349 B1 | * | 6/2002 | Onyon | 33/551 |
| 6,411,915 B1 | | 6/2002 | Nguyen et al. | |
| 6,714,679 B1 | * | 3/2004 | Scola et al. | 382/199 |
| 6,748,112 B1 | | 6/2004 | Nguyen | |
| 6,907,358 B2 | * | 6/2005 | Suh et al. | 702/38 |
| 2005/0283334 A1 | * | 12/2005 | Fascinato et al. | 702/167 |

FOREIGN PATENT DOCUMENTS

| | | |
|---|---|---|
| DE | 42 23 483 A1 | 1/1994 |
| EP | 1 574 818 A2 | 9/2005 |
| EP | 1 607 713 A1 | 12/2005 |
| WO | WO 00/06969 | 2/2000 |

OTHER PUBLICATIONS

Written Opinion, App. No. SG 200600342-0, Nov. 24, 2006.
Search Report, App. No. SG 200600342-0, Nov. 24, 2006.

* cited by examiner

*Primary Examiner*—G. Bradley Bennett
*Assistant Examiner*—Tania C Courson
(74) *Attorney, Agent, or Firm*—William Scott Andes; Armstrong Teasdale LLP

(57) ABSTRACT

Methods and apparatus for inspecting a component are provided. The method includes receiving a plurality of data points that define a shape of the component, fitting the received data points to a curve that defines a predetermined model shape, and comparing the received data points to the curve defining the predetermined model shape to determine a break radius of the component.

20 Claims, 4 Drawing Sheets

METHODS AND SYSTEM FOR INSPECTION OF FABRICATED COMPONENTS

BACKGROUND OF THE INVENTION

This invention relates generally to non-destructive inspection and, more particularly, to dimensional inspection of fabricated components.

Dimensional inspection techniques are used in many applications where the non-destructive evaluation (NDE) of a workpiece or component is desired. At least some known inspection techniques include a visual or manual inspection to facilitate determining a service condition of a component. A knowledgeable and skilled technician may be able to ascertain the worthiness of a particular component for replacement using visual or manual inspection, however visual or manual inspection may not be accurate enough for modem components, nor repeatable for quality verification purposes. For example, a compressor blade dovetail outer edge break radii may be small and span only a few degrees of arc, which may require a relatively accurate relative measurement to determine the actual radius.

BRIEF DESCRIPTION OF THE INVENTION

In one embodiment, a method of inspecting a component is provided. The method includes receiving a plurality of data points that define a shape of the component, fitting the received data points to a curve that defines a predetermined model shape, and comparing the received data points to the curve defining the predetermined model shape to determine a break radius of the component.

In another embodiment, a dimensional inspection system is provided. The inspection system includes a fixture configured to maintain a component in a predetermined fixed position during a scan of the component, a profileometer configured to trace a profile of the component, and a controller communicatively coupled to the profileometer, the controller configured to compare the traced profile to a curve defining a predetermined model shape to determine whether a break radius of the traced profile substantially equals a predetermined allowable break radius of the component.

In yet another embodiment, a computer program embodied on a computer readable medium is provided. The computer program includes a code segment that prompts a user to select a predetermined profile specification and then determines an initial position of at least one of a tracing shaft and a measurement unit, receives a plurality of data points that define a profile of a component, determines, using the predetermined profile specification and the plurality of received data points, whether the component profile is substantially equal to the predetermined profile specification, and transmits an indication of the determination to at least one of a display and a computer readable file.

DETAILED DESCRIPTION OF THE INVENTION

As used herein, the term "component" may include any component configured to be coupled within a gas turbine engine, wherein the component may include dimensional characteristics indicative of component wear and/or failure The turbine blade dovetail illustrated is intended as exemplary only, and thus is not intended to limit in any way the definition and/or meaning of the term "component". Furthermore, although the invention is described herein in association with a gas turbine engine, and more specifically for use with a rotor for a gas turbine engine, it should be understood that the present invention is applicable to other components, such as gas turbine engine stationary components, and components associated with machines other than gas turbine engines. Accordingly, practice of the present invention is not limited to gas turbine engines.

Figure 1:
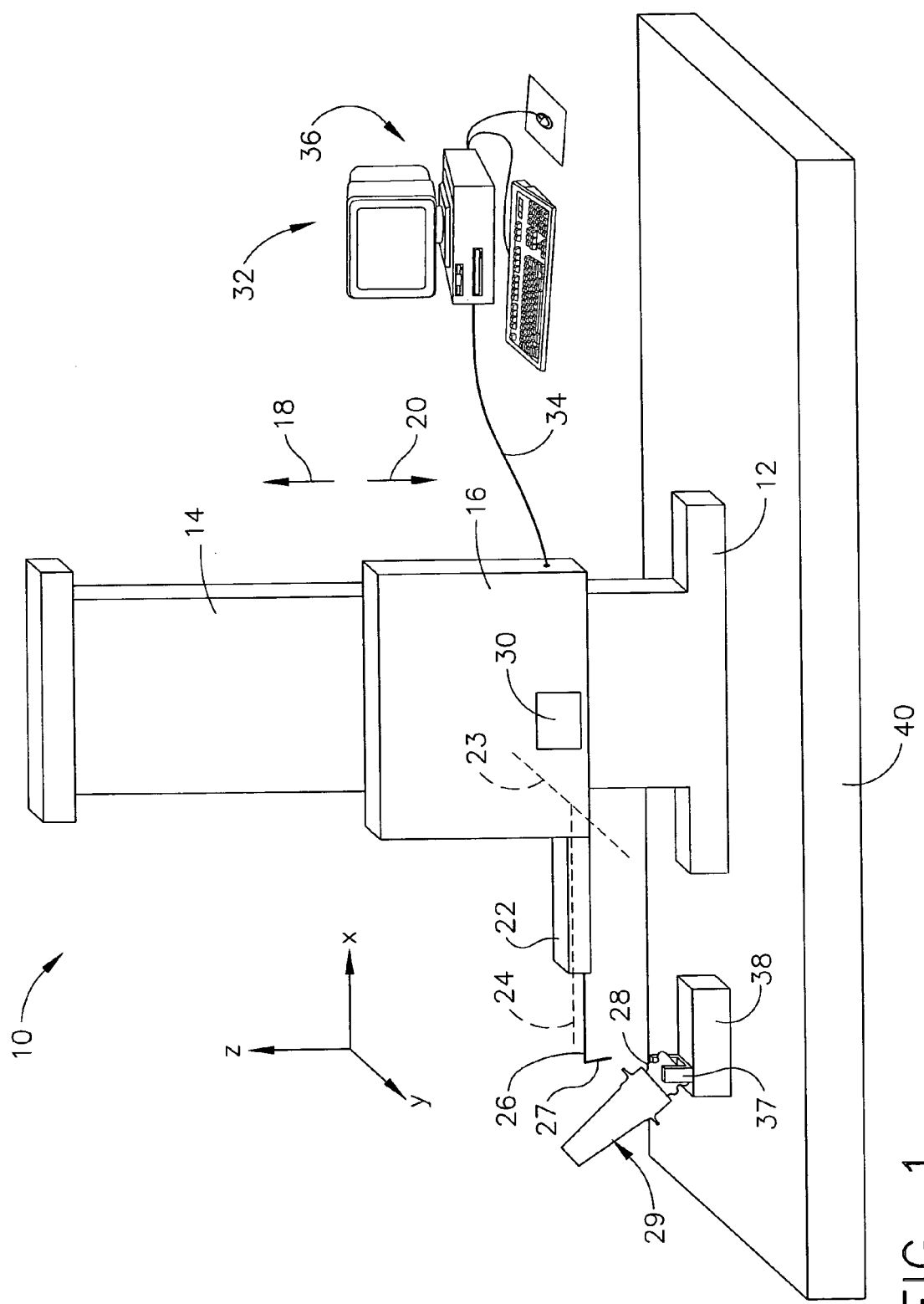
FIG. 1 is a schematic view of an exemplary embodiment of a profile measuring gauge system.

FIG. 1 is a schematic view of an exemplary embodiment of a profile measuring gauge system 10. System 10 includes a base 12 that supports a column 14. A main housing 16 is coupled to column 14 such that main housing 16 may translate substantially vertically in a first direction, indicated by arrow 18 and in an opposite direction, indicated by arrow 20. Main housing 16 includes electronic circuitry to facilitate controlling operation of gauge system 10 and pre-processing data. A support arm 22 is slidably coupled to main housing 16 such that support arm 22 may be translated horizontally along a longitudinal axis 24. A stylus 26 coupled to support arm 22 may be mounted such that it can pivot in order to enable a tip 27 of stylus 26 to trace a surface 28 of a workpiece or component 29 during relative movement of stylus 26 and surface 28.

The displacement of stylus 26 as it follows surface 28 is detected using a transducer 30 and an output of the transducer may be transmitted to data logging and processing equipment 32 (e.g. a personal computer) through a cable 34 or other communications link, including optic and wireless communication devices. Data indicating a relative position of tip 27 of stylus 26 along component 29 also may be transmitted to data logging and processing equipment 32 to provide data indicative of a measurement of a surface profile or form of component 29. Either Stylus 26, surface 28, or both may be moved with respect to the other member so as to allow the generation of a two- or three-dimensional surface map which can then be displayed on a visual display unit 36 or printed as a hard copy. In the exemplary embodiment, a linear variable differential transducer (LVDT) is used in combination with stylus 26 to detect the position of tip 27 as it traces surface 28 of component 29.

A turntable 38 for supporting component 29 on a high accuracy air bearing spindle, may be coupled directly to base 12, or maybe coupled to a common support, such as a work bench 40. Turntable 38 may incorporate a clamping device or retaining member that may be used to secure component 29 in a fixed position relative to stylus 26.

Support arm 22 may be pivotally mounted within main housing 16 such that support arm 22 is pivotable about an axis 23 extending in a direction parallel to work bench 40. For example, in one embodiment, support arm 22 is pivotable generally horizontally and as such, is substantially perpendicular to axis 24.

In operation, component 29 including surface 28 whose profile is to be measured is mounted to turntable 38. In the exemplary embodiment, surface 28 of component 29 includes a curved portion, or break edge, that has a radius of curvature, or break radius (see FIG. 3). In the exemplary embodiment, component 29 is a gas turbine engine compressor blade having a dovetail outer break edge. The break edge radii may be relatively small and span only a few degrees of arc. Component 29 may be mounted on turntable 38 and secured such that component 29 is maintained in position at a predetermined height and distance such that tip 27 may be positioned to contact surface 28. During a scan, support arm 22 may be retracted axially from a first starting position, which also defines a starting position of tip 27. During retraction of support arm 22, tip 27 traces the contour of surface 28. Contact between tip 27 and surface 28 is facilitated to be maintained by a biasing mechanism, such as, for example, gravity, a spring, or any other suitable biasing member (not shown). Any displacement of tip 27 from the starting position is detected by transducer 30 and a corresponding output is generated.

Figure 2:
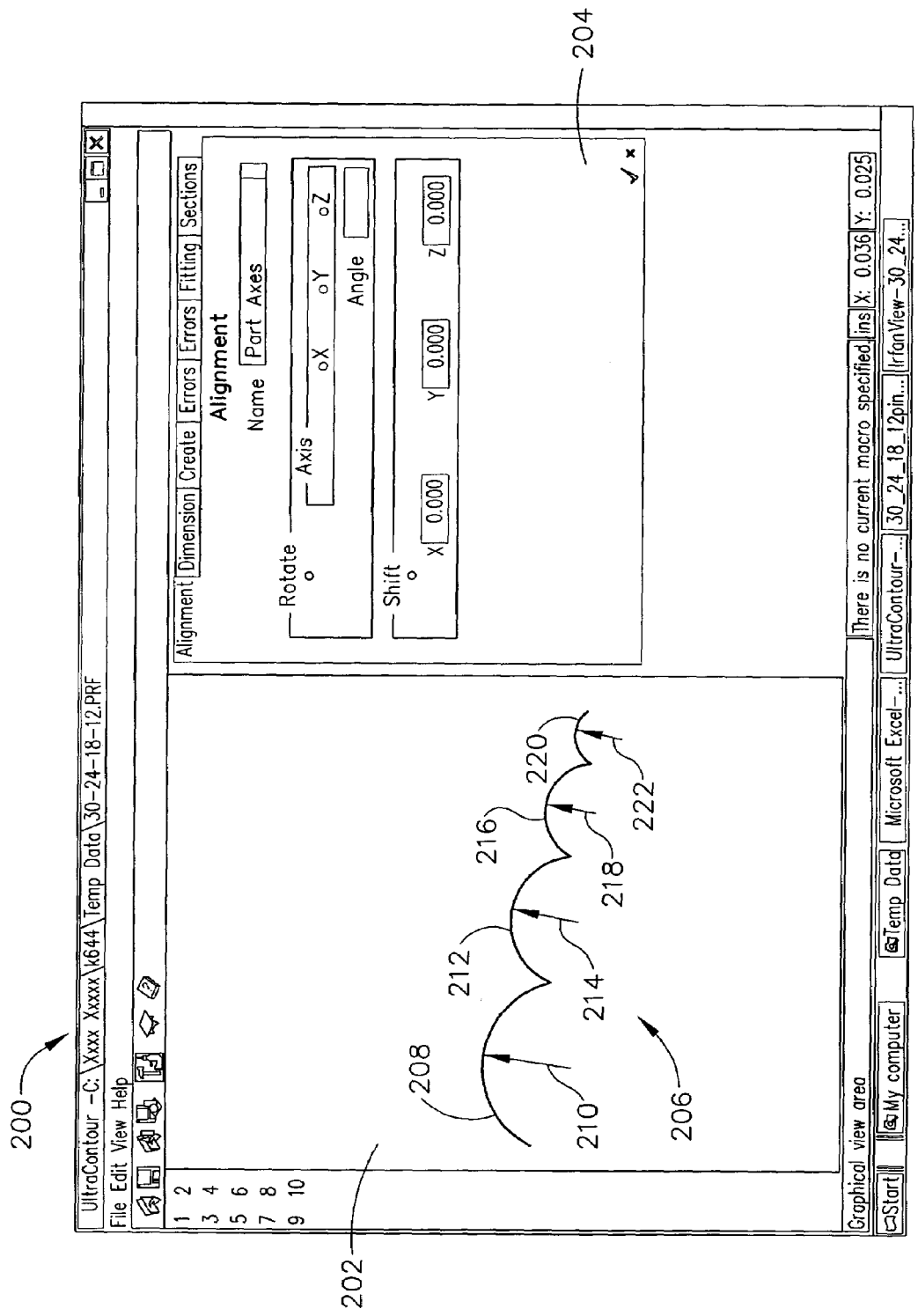
FIG. 2 is an exemplary screen shot of an output that may be generated by the profile measuring gauge system shown in FIG. 1 in response to measuring a quality indicator gauge.

FIG. 2 is an exemplary screen shot 200 of an output that may be generated by profile measuring gauge system 10 in response to measuring a quality indicator gauge (not shown). A quality indicator gauge may be used as a standard for a calibration and/or performance check of profile measuring gauge system 10. In the exemplary embodiment, the quality indicator gauge includes four lobes that each have a different radius with respect to each other lobe. Screen shot 200 includes a display area 202 and a control panel 204. Control panel 204 may be used to control a display of data in display area 202.

In the exemplary embodiment, display area 202 illustrates a curve 206 of data points of the quality indicator gauge collected by profile measuring gauge system 10. A first portion 208 of curve 206 is generated in response to data collected from a first lobe of the quality indicator gauge. A radius of first portion 208 is indicated by a line 210 and a value of the radius may be displayed in display area 202. A second portion 212 of curve 206 is generated in response to data collected from a second lobe of the quality indicator gauge. A radius of second portion 212 is indicated by a line 214 and a value of the radius may be displayed in display area 202. A third portion 216 of curve 206 is generated in response to data collected from a third lobe of the quality indicator gauge. A radius of third portion 216 is indicated by a line 218 and a value of the radius may be displayed in display area 202. A fourth portion 220 of curve 206 is generated in response to data collected from a fourth lobe of the quality indicator gauge. A radius of fourth portion 208 is indicated by a line 222 and a value of the radius may be displayed in display area 202.

Figure 3:
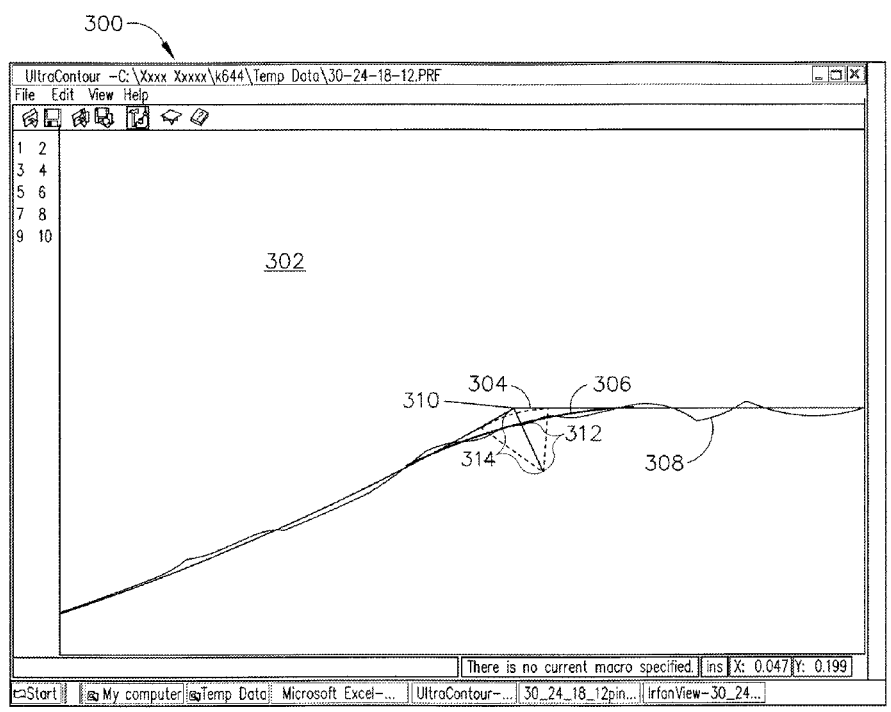
FIG. 3 is an exemplary screen shot of an output that may be generated by the profile measuring gauge system shown in FIG. 1 in response to measuring a component contour.

FIG. 3 is an exemplary screen shot 300 of an output that may be generated by profile measuring gauge system 10 in response to measuring component 29. In the exemplary embodiment, component 29 is a dovetail portion of a gas turbine engine blade. In an alternative embodiment, component 29 may be any component, or portion of a component, that a user desires measuring to obtain dimensional information. Screen shot 300 includes a display area 302 that displays information regarding the operation of a curve fitting algorithm utilized by profile measuring gauge system 10. In various embodiments, the curve-fitting algorithm may be executed by another machine using data accessible from profile measuring gauge system 10 through a network, communication media, data storage media or other data communications device. A first CAD curve 304 defines a specification profile for a shape of component 29 traced by profile measuring gauge system 10. Cad curve 304 may be stored in a database containing data associated with component 29, such as the specification for the profile measured by profile measuring gauge system 10. A limit curve 306 defines a limit for the maximum radius for a contour of component 29 traced by profile measuring gauge system 10. In the exemplary embodiment, the maximum radius is selected to be about 0.015 inches.

A curve 308 displays data received by profile measuring gauge system 10 during a scan of component 29. Curve 308 includes a plurality of discrete data points sampled by profile measuring gauge system 10 as tip 27 traces surface 28 of component 29. In the exemplary embodiment, an iterative curve-fitting algorithm selects a portion of the plurality of discrete data points, such as forty points on each side of a selected midpoint 310, to "best fit" to CAD curve 304. A break radius 312 for each of the selected midpoints 310 may be calculated and the calculated midpoint break radius 314 values may then be combined, for example, by averaging a selectable number of the calculated midpoint break radius values, to generate an output.

Figure 4:
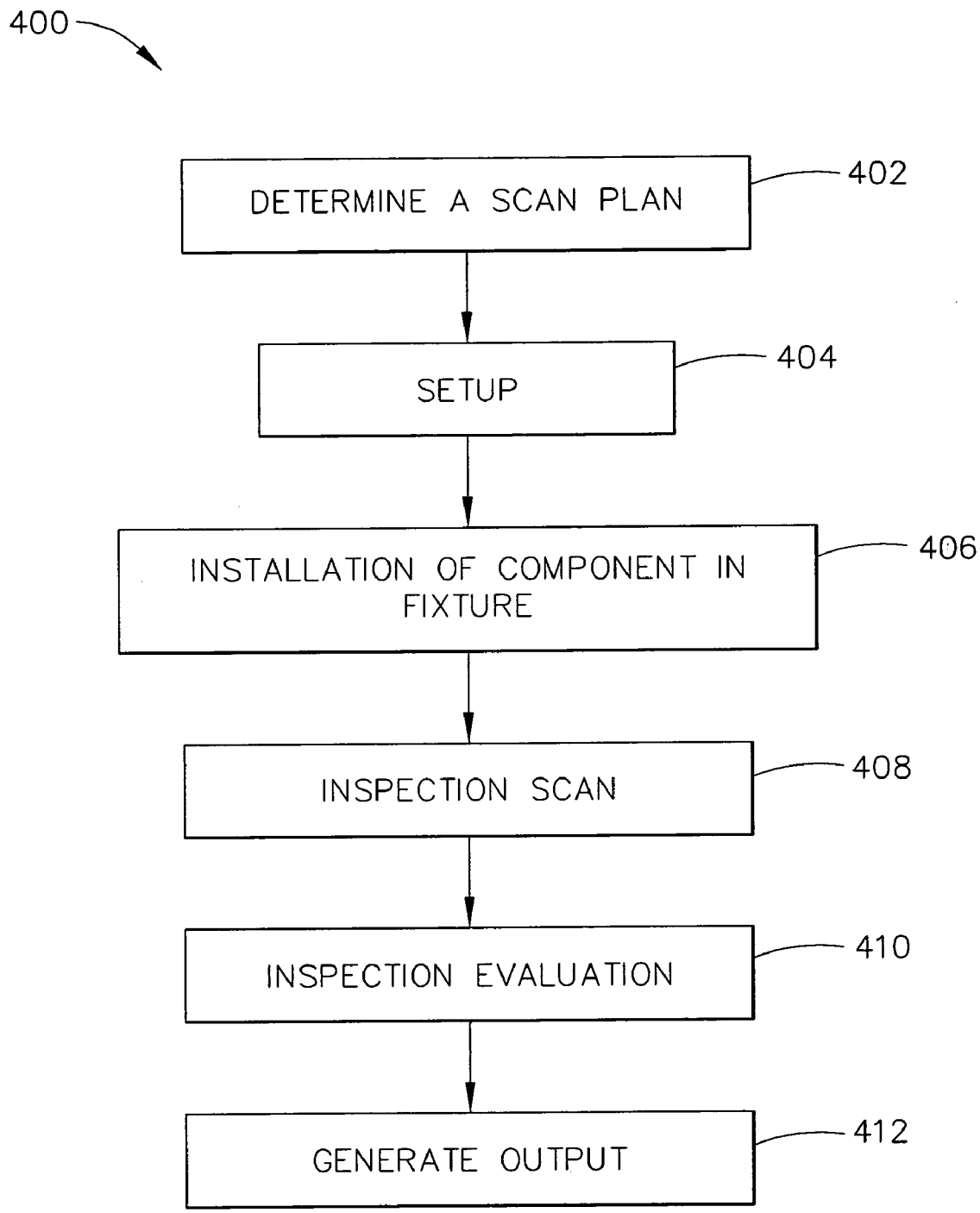
FIG. 4 is a flow chart illustrating an exemplary method of evaluating a radius of the component shown in FIG. 1.

FIG. 4 is a flow chart of an exemplary method 400 of evaluating a radius of a component, such as component 29 (shown in FIG. 1). Method 400 includes determining 400 a inspection plan for the component being inspected, based at least partially on a part number of component 29. An inspection plan for each configuration of component 29 is used to generate the measurement. The scan plan may be used to control system 10 to generate scans at one or more locations across a leading edge side of the dovetail, for example, at three locations, such as, one at the center and one each side of center on the leading edge dovetail side. The determined scan plan may control system 10 to generate scans at one or more locations on a trailing edge dovetail side, for example, three locations, such as, one at the center and one each side of the trailing edge side of the dovetail.

Depending on the component being inspected, a setup 404 of system 10 may include a check scan using a quality indicator gauge or gauge master to conduct a calibration check of system 10. The gauge master may be positioned in fixture 37 such that a dovetail surface of the gauge master is oriented generally horizontally such that fixture 37 grips the gauge master on opposing sides that are substantially perpendicular to the dovetail. In the exemplary embodiment, the scan X-zero is started at approximately 0.030 inches from a dovetail valley of the gauge master. The scan Z-zero is started at approximately the depth of the dovetail valley. The X-scan increment may be selected to be a predetermined value, for example, fifteen micro-inches. After the gauge master is scanned, an evaluation macro is processed by system 10 or another processor. In the exemplary embodiment, for an acceptable scan, the radius measurement may be verified to be within approximately 0.002 inches of previous measurements.

Component 29 may be oriented within fixture 37, for example, along a Y-axis of system 10. Component 29 may be clamped or coupled, for example, along the dovetail sides using fixture 37. A locator (not shown), for example, a notch may be used to facilitate positioning the dovetail such that the dovetail to be inspected is oriented approximately horizontally.

After system 29 is checked for calibration, an inspection scan 408 may be conducted. The scan plan is initiated such that arm 22 is withdrawn axially while tip 27 remains in contact with surface 28. Tip 27 is biased to maintain contact with surface 28. The X and Z values of arm 22 are measured and preprocessed by system 10. An evaluation 410 of the inspection scan is conducted using a software algorithm, such as UltraContour Software. Evaluation 410 is used to generate the edge radius of the contour traced by tip 27 during inspection scan 408. During the evaluation 410, CAD data is extracted from component 29 contour. The CAD data is trimmed to fit into a selectable length of scan data. The scan data is includes the area of the maximum edge radius.

The scan data is acquired from approximately 0.010" before the maximum edge radius to approximately 0.100" beyond the radius along the traced length. Evaluation 410 reads in the CAD data and the scan data. For each of the scans performed on component 29, the scan data is fitted to the CAD data by iterating, for example, ten times. The CAD data is then deleted. An arc is fitted to the scan data between the start and end of the maximum edge radius. The fitted arc is dimensioned and the maximum edge radius value is reported. In the exemplary embodiment, six measurements (three on each side of the blade) are made and the average measurement is reported 412 as the blade value. A passing criteria for each component 29 may include, for example, the average of the six edge radii may exceed a predetermined value, the average radius may not exceed 100% of a drawing specification, and/or none of the reported values may exceed 200% of a drawing maximum edge break.

A technical effect of the various embodiments of the systems and methods described herein include at least one of the accurate and repeatable determination of component dimensions and comparison of those dimensions to a predetermined specification to facilitate inspection and maintenance of various components.

The above-described methods and apparatus are cost-effective and highly reliable for determining a dimension, such as a maximum break radius of a component. The methods and apparatus describe repeatable data sets using a profileometer, fitting collected scan data to a specification curve, and determining whether the scanned data meets predetermined specification criteria. The methods and apparatus described above facilitate fabrication, assembly, and reducing the maintenance cycle time of components in a cost-effective and reliable manner.

An exemplary embodiment of a component inspection system is described above in detail. The system illustrated is not limited to the specific embodiments described herein, but rather, components of each may be utilized independently and separately from other components described herein.

While the invention has been described in terms of various specific embodiments, those skilled in the art will recognize that the invention can be practiced with modification within the spirit and scope of the claims.

What is claimed is:

1. A method of inspecting a component, said method comprising:
   receiving a plurality of data points from a tracing shaft that define a shape of the component in contact with the tracing shaft;
   selecting a predetermined model shape having specification data points that define a desired profile of the component;
   fitting the received data points to a curve that defines the predetermined model shape using a curve fitting algorithm;
   iteratively determining a midpoint of the plurality of data points;
   iteratively determining a break radius at each of the midpoints; and
   comparing the received data points to the curve defining the predetermined model shape to determine whether the break radius of the component is substantially equal to a break radius of the predetermined profile specification.

2. A method in accordance with claim 1 wherein receiving a plurality of data points further comprises receiving the plurality of data points that define an outer break edge radius of the component.

3. A method in accordance with claim 1 wherein receiving a plurality of data points further comprises receiving the plurality of data points from a scan of the component using a contact profileometer.

4. A method in accordance with claim 1 wherein fitting the received data points to a predetermined model shape further comprises fitting the curve defined by the received data points to the specification data points.

5. A method in accordance with claim 4 wherein fitting the received data points to a predetermined model shape further comprises:
   determining a maximum edge radius of the received data points; and
   fitting an arc to the received data points between a start of the maximum edge radius and an end of the maximum edge radius.

6. A method in accordance with claim 5 wherein determining the maximum edge radius of the component comprises determining the maximum edge radius of the fitted arc.

7. A method in accordance with claim 1 further comprising outputting the break radius to at least one of a display and a computer-readable file.

8. A dimensional inspection system comprising:
   a fixture configured to maintain a component in a predetermined fixed position during a scan of the component;
   a profileometer configured to trace a profile of the component, wherein said profileometer and said fixture are coupled to a common support base; and
   a controller communicatively coupled to said profileometer, said controller configured to determine a midpoint from a plurality of data points and iteratively calculate a break radius for each of the selected midpoints and further compare the traced profile to a curve defining a predetermined model shape to determine whether the break radius of the traced profile substantially equals a predetermined allowable break radius of the component.

9. A dimensional inspection system in accordance with claim 8 wherein said profileometer comprises:
   a contact pin configured to maintain contact along a surface of the component;
   a tracing shaft comprising a distal end coupled to said contact pin, and a pivot end, said tracing shaft configured to pivot about a pivot axis in said pivot end;
   a measurement unit rotatably coupled to said pivot axis, said measurement unit configured to generate an output signal indicative of an amount of rotation of said tracing shaft, said measurement unit configured to translate said pivot axis in a direction in a plane of rotation of said tracing shaft.

10. A dimensional inspection system in accordance with claim 9 wherein said controller comprises a processor programmed to:
   receive output signals from said measurement unit as a function of the translation of said pivot axis;
   fit the curve defined by the received output signals to a selectable predetermined specification curve; and
   determine a maximum edge radius of the fitted curve.

11. A dimensional inspection system in accordance with claim 8 wherein said controller comprises a processor programmed to control translation of said pivot axis during the scan.

12. A dimensional inspection system in accordance with claim 11 wherein said controller comprises a processor programmed to:
fit an arc to a fitted curve between a start of a maximum edge radius and an end of the maximum edge radius;
determine the break radius of the fitted arc; and
output the break radius to at least one of a display and a computer-readable file.

13. A computer program embodied on a computer readable medium, said computer program comprising a code segment that prompts a user to select a predetermined profile specification and then;
determines an initial position of at least one of a tracing shaft and a measurement unit, wherein the tracing shaft is coupled to a profileometer;
receives a plurality of data points from the tracing shaft that define a profile of a component in contact with the tracing shaft;
iteratively determines a midpoint of the plurality of data points and a break radius at each of the midpoints;
determines, using the predetermined profile specification and the plurality of received data points, whether a break radius of the component profile is substantially equal to a break radius of the predetermined profile specification; and
transmits an indication of the determination to at least one of a display and a computer readable file.

14. A computer program in accordance with claim 13 wherein said code segment is further programmed to determine the break radius of the component using a comparison of the received plurality of data points to the curve defining the predetermined model shape.

15. A computer program in accordance with claim 13 wherein said received plurality of data points define an outer break edge radius of the component.

16. A computer program in accordance with claim 13 wherein said received plurality of data points are received from a contact profileometer.

17. A computer program in accordance with claim 13 wherein said code segment is further programmed to fit a curve defined by the received data points to the selected predetermined profile specification.

18. A computer program in accordance with claim 13 wherein said code segment is further programmed to:
determine a maximum edge radius of the received data points; and
fit an arcd to the received data points between a start of the maximum edge radius and an end of the maximum edge radius.

19. A computer program in accordance with claim 18 wherein said code segment is further programmed to determine the break radius of the fitted arc.

20. A computer program in accordance with claim 13 wherein said code segment is further programmed to output the break radius to at least one of a display and a computer-readable file.

* * * * *